Oct. 17, 1967 M. F. HEIDMANN ET AL 3,347,046
CONTROL OF TRANSVERSE INSTABILITY IN ROCKET COMBUSTORS
Filed May 9, 1967
2 Sheets-Sheet 1

INVENTORS
MARCUS F. HEIDMANN
CHARLES E. FEILER
BY
ATTORNEYS

Oct. 17, 1967 M. F. HEIDMANN ETAL 3,347,046
CONTROL OF TRANSVERSE INSTABILITY IN ROCKET COMBUSTORS
Filed May 9, 1967 2 Sheets-Sheet 2

INVENTORS
MARCUS F. HEIDMANN
CHARLES E. FEILER

BY

ATTORNEYS

United States Patent Office 3,347,046
Patented Oct. 17, 1967

3,347,046
CONTROL OF TRANSVERSE INSTABILITY
IN ROCKET COMBUSTORS
Marcus F. Heidmann, 3490 Higley Road, Rocky River,
Ohio 44116, and Charles E. Feiler, 4240 Wooster
Road, Fairview Park, Ohio 44126
Filed May 9, 1967, Ser. No. 638,194
10 Claims. (Cl. 60—243)

ABSTRACT OF THE DISCLOSURE

Combustion is dynamically stabilized by opposing or correcting against oscillation at its inception by detecting a spinning oscillation and initiating a tangential velocity in the opposite direction. This is accomplished either by changing the vector direction of the propellant as it is injected into the combustion chamber or by tangentially injecting a portion of the propellant.

---

The invention described herein was made by employees of the United States Government and may be manufactured and used by or for the Government for governmental purposes without the payment of any royalties thereon or therefor.

This invention is concerned with achieving dynamic stability in a rocket combustor. The invention is particularly directed to the suppression or elimination of combustion instability of the type which exhibits spinning or travelling transverse waves.

Combustion instability in rocket engines presents many problems. In the combustion chambers of very large rocket engines these problems are complicated by a travelling transverse resonance. A rocket combustor is normally designed to achieve neutral stability below some maximum expected size of disturbance so that combustion is stable for normal operation. Acoustic liners, chamber baffles, changes in drop and jet break up times, axial energy release, and modification of combustion geometry have been utilized in attempts to achieve stability. However, none of these prior art suggestions has been completely successful, especially in large rocket engines.

According to the present invention stability is achieved in a rocket engine by opposing or correcting against oscillation as its starts. This is accomplished either by changing the vector direction of the propellant as it is injected into the combustion chamber or by injecting the propellant tangentially.

It is, therefore, an object of the present invention to dynamically stabilize combustion in a large rocket combustor.

Another object of the invention is to provide a method and apparatus for changing the vector direction of propellant as it is injected into a rocket combustion chamber to stabilize combustion.

A still further object of the invention is to provide a method and apparatus for injecting a portion of the propellant tangentially into the rocket combustion chamber.

These and other objects of the invention will be apparent from the specification which follows and from the drawings wherein like numerals are used throughout to identify like part.

Figure 1:
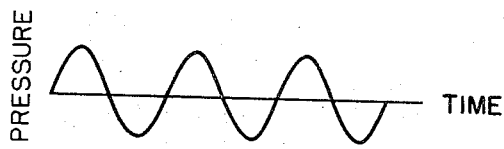
FIG. 1 is a time-pressure trace of pressure oscillations of a travelling transverse wave with no steady velocity component.
Figure 2:
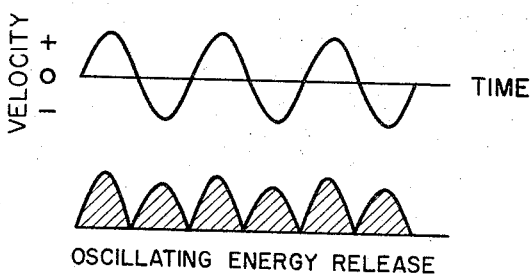
FIG. 2 is a time-velocity trace of tangential velocity oscillations of a travelling transverse wave having no steady flow in the plane of the wave together with a curve showing the corresponding oscillating energy release.
Figure 3:
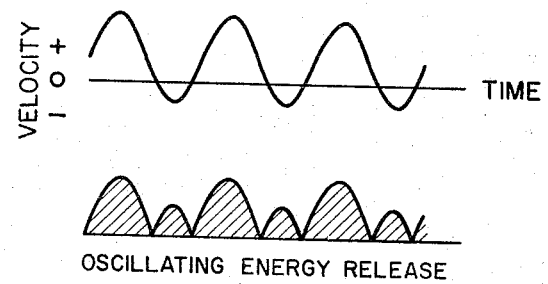
FIG. 3 is a time-velocity trace of tangential velocity oscillations of a travelling transverse wave with a steady flow in the direction of the wave together with a curve showing the corresponding oscillating energy release.
Figure 4:
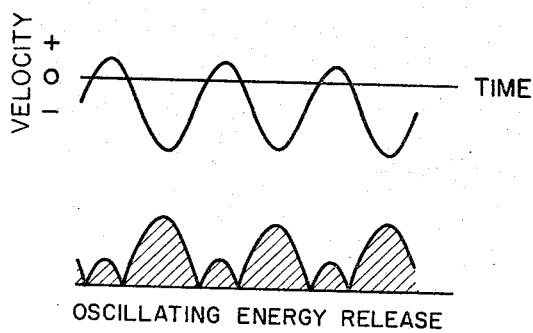
FIG. 4 is a time-velocity trace of tangential velocity oscillations of a travelling transverse wave having a steady flow in the opposite direction from the wave together with a curve showing the corresponding oscillating energy release.

Referring now to the drawings, the traces and curves in FIGS. 1 to 4 show the phase relation for spinning transverse waves in a rocket combustion chamber and illustrate quasi-steady velocity-dependent combustion mechanism. The abscissa for each trace and curve is time. In FIG. 1 the ordinate is pressure, and the trace shows variations of pressure with time in a rocket combustion chamber. The ordinate for each of the upper traces in FIGS. 2 to 4 is velocity while the lower wave in each of these figures is a corresponding energy release curve.

The upper trace in FIG. 2 shows variations in velocity with time for a travelling transverse wave without a steady velocity component corresponding to the pressures shown in FIG. 1. The energy released is linearly related to the product of absolute velocity and density. The energy release curve is shown in the lower line in FIG. 2. It can be seen in FIGS. 1 and 2 that the energy release is nearly symmetric and reaches a maximum twice during each cycle of the pressure wave. Therefore, insufficient energy is added preferentially to either drive or damp the wave, and the system is considered to be neutrally stable.

If a time-independent velocity, or steady velocity, is superimposed on the oscillating velocity as shown in FIG. 3, the in-phase energy release increases at the expense of the out-of-phase energy release. The wave is thereby driven by biasing the velocity in the direction of wave motion.

Biasing the velocity in the direction opposite to the wave motion results in the trace shown in FIG. 4. In this case there is a net increase in the out-of-phase energy release, and the wave is damped.

The traces and curves shown in FIGS. 1 to 4 illustrate a manner of controlling transverse spinning combustion instability in accordance with the present invention. A spinning transverse wave travels in a circular path around the combustion chamber in either a clockwise or counterclockwise direction. This wave is coupled or phase related to the various combustion mechanisms in such a way as to drive the oscillation. A more complete description of oscillatory combustion is set forth in NASA TN D-2753.

The present invention is based on the ability to change the phase relation between the wave and at least one combustion mechanism which contributes to the driving so that combustion is stabilized. The particular mechanism is velocity sensitive.

The requirements for controlling the instability are a controllable tangential velocity and a means for determining the propagation direction and magnitude of the wave. Upon detection of a spinning oscillation, a tangential velocity opposite to the direction of the wave is initiated, and the energy relase of this combustion process causes the wave to damp. The tangential velocity is reduced as the wave decays, and this velocity is reversed in direction if a wave in the opposite direction develops. In this manner, positive stabilization of the combustor is provided.

The propellants to be burned are used as the source of tangential velocity. For example, injection of propellant in a manner so that its vector direction is changed or the injection of part of the propellant tangentially provides this desired result. It is also contemplated that other expedients, such as variable angle control vanes or baffles, secondary flow injection, combustion gas by-pass, and other techniques may be utilized in certain applications. Achieving stability by controlling tangential flow avoids the ordinary methods of stabilization, such as injector changes and baffle installations, that are presently employed and are unique in each combustor.

Figure 5:
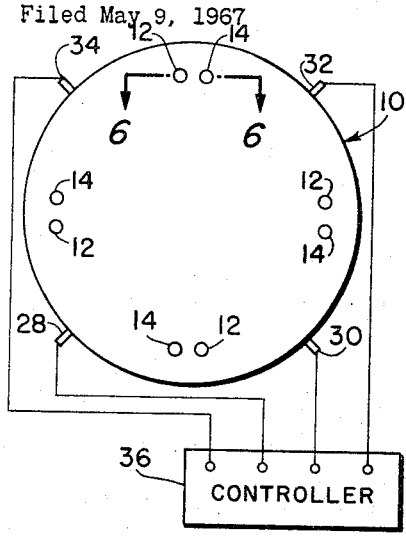
FIG. 5 is an elevation view of an injector face plate in a rocket combustor showing an array of impinging jets.
Figure 6:
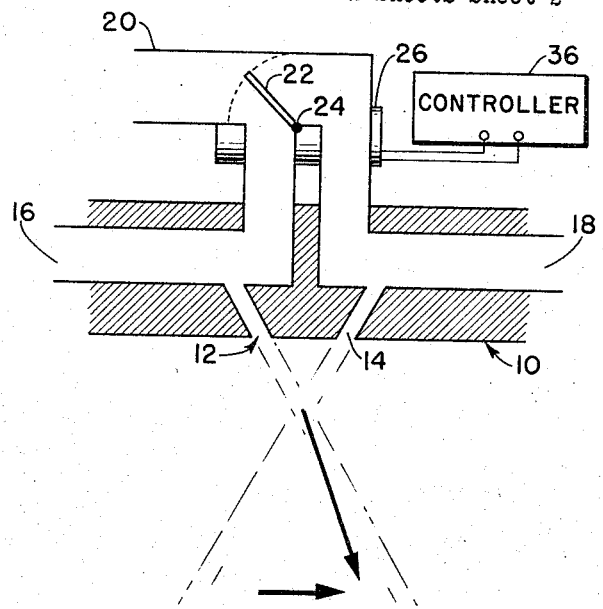
FIG. 6 is an enlarged sectional view taken along the line 6—6 in FIG. 5.

FIGS. 5 and 6 illustrate a manner in which the resultant vector of impinging jets of propellant is controlled. This vector is utilized to initiate a tangential velocity in the direction opposite that of a spinning transverse wave in the combustor.

FIG. 5 shows an injector face plate 10 which is mounted on one end of a rocket combustor. Pressurized propellant is selectively injected into the combustor through a plurality of orifices 12 which extend through the face plate 10. Each orifice 12 is angularly disposed to the longitudinal axis of the combustor as shown in FIG. 6 in a plane parallel to this longitudinal axis as shown in FIG. 5. In this manner the propellant enters the combustor at an angle relative to its longitudinal axis.

Propellant is likewise injected through another group of orifices 14 in the face plate 10. Each orifice 14 is angularly disposed to the longitudinal axis of the combustor in a plane parallel to this axis.

The orifices 12 and 14 are paired as shown in FIGS. 5 and 6, and the centerlines of the orifices in each pair intersect as best seen in FIG. 6. A manifold 16 is provided for supplying a propellant to the orifices 12 while a similar manifold 18 is provided for the orifices 14.

The propellant is supplied to both manifolds 16 and 18 through a propellant supply line 20 which is connected to a suitable propellant source. A diverter plate 22 in the propellant supply line 20 controls the flow of propellant to the manifolds 16 and 18. The plate 22 is pivotally mounted on a shaft 24 which is turned by a servomotor 26.

When the shaft 24 moves the flow diverter 22 counterclockwise to close the supply port of the manifold 16, all of the propellant is directed to the manifold 18. The only propellant entering the combustor flows through the orifices 14, and the propellant jets have vectors which extend along the orifice centerlines. These vectors will oppose a wave travelling in a clockwise direction in FIGS. 5 and 6.

When the servomotor 26 moves the flow diverter in a clockwise direction to the opposite position which closes the entry port to the manifold 18, all the propellant is directed to the manifold 16 and is injected into the combustion chamber through the orifices 12. The resulting vectors extend along the centerlines of the orifices 12 and oppose any wave travelling in a counterclockwise direction in FIGS. 5 and 6. When the flow diverter 22 is positioned midway between the entry ports to the manifolds 16 and 18, the flow of propellant from the line 20 is balanced, and the resultant vector is substantially normal to the surface of the face plate 10. This condition exists when there is no travelling transverse wave.

The pressures in the combustor about its periphery adjacent the face plate 10 are constantly monitored by a plurality of pressure probes 28, 30, 32 and 34 mounted 90° apart as shown in FIG. 5. The pressures at the respective probes are constantly sensed and furnished to a controller 36 which, in turn, operates the servomotor 26 which positions the flow diverter 22.

When a pressure oscillation in the form of travelling wave is initiated in the combustor, it is immediately sensed by the differences in pressures at the probes 28–32. The direction of rotation is also sensed by these pressure probes. The controller 36 properly positions the flow diverter 22 to produce a resultant vector between the jets emerging from the orifices 12 and 14 which opposes the travelling transverse wave. When this wave is stopped the pressure probes 28–34 will sense this information and initiate the signal which properly positions the flow diverter 22 through the controller 36. If this were not done the resultant vector could initiate a travelling wave in the opposite direction.

Figure 7:
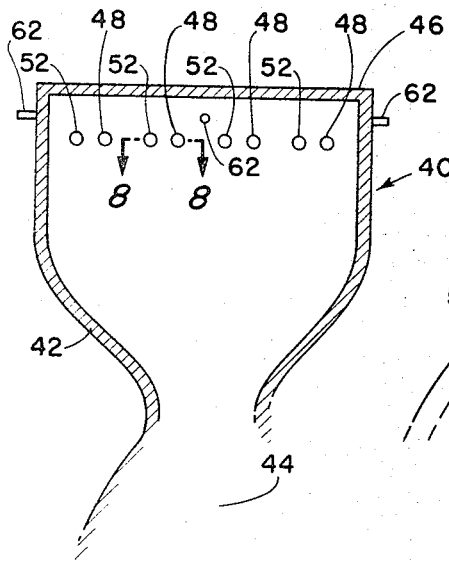
FIG. 7 is a longitudinal section view through a rocket combustion chamber showing the position of jets for tangential injection of coolant flow in an impinging pattern.
Figure 8:
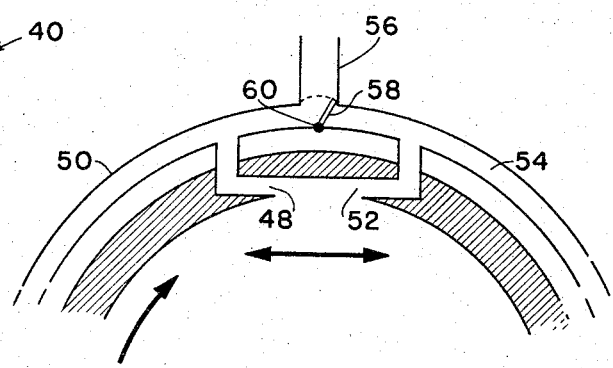
FIG. 8 is an enlarged section view taken along the line 8—8 in FIG. 7.

Another embodiment of the invention is shown in FIGS. 7 and 8 wherein a portion of the liquid propellant is injected tangentially into the combustor. In this embodiment a rocket engine 40 has a combustion chamber 42 with a nozzle 44 at one end and an injector 46 at the opposite end. A major portion of the propellant is supplied to the combustion chamber 42 by the injector 46.

A plurality of orifices 48 extend about the periphery of the combustion chamber 42 adjacent the injector 46 as shown in FIG. 7. The orifices 48 extend through the wall of the combustor and are in communication with a propellant supply manifold 50. Each orifice 48 is substantially tangent to the wall of the combustor in a plane normal to the axis of the combustion chamber 42. A portion of the propellant enters the combustion chamber 42 along a path that is substantially tangent to the inner wall of the combustion chamber 42. Each orifice 52 faces a mating orifice 48 with which it is matched as shown in FIGS. 7 and 8. A manifold 54 is provided for supplying propellant to the orifices 52.

The propellant is supplied to both the manifolds 50 and 54 through a propellant supply line 56 which is connected to a suitable source of pressurized propellant. A diverter plate 58 at the end of the supply line 56 controls the flow of propellant to the manifolds 50 and 54. The plate 58 is pivotally mounted on a shaft 60 which is turned by a servomotor in the manner previously described with regards to the diverter plate 22 shown in FIG. 6.

When the shaft 60 moves the flow diverter 58 in a counterclockwise direction, it closes communication between the manifold 50 and the supply 56. A portion of the propellant is injected into the combustor through the orifices 52, and the resulting jets of propellant so injected have vectors tangent to the inner surface of the combustor. These vectors will oppose any wave travelling in a clockwise direction in FIG. 8.

When the servomtor moves the flow diverter 58 in a clockwise direction to the opposite position which breaks communication with the manifold 54, a portion of the propellant is injected tangentially into the combustion chamber 42 through the orifices 48. The resulting jets oppose any wave traveling in a counterclockwise direction in FIG. 8.

As in the embodiment shown in FIGS. 5 and 6 the flow of propellant from the line 56 is balanced between the manifolds 50 and 54 when the flow diverter 22 is positioned midway between their respective entry ports. This condition exists when there is no travelling transverse wave.

As in the previous embodiment, the pressures in the combustor about its periphery adjacent the face of the injector 46 are constantly monitored by a plurality of pressure probes 62 positioned at right angles. Pressures at the probes 62 are constantly sensed and furnished to a controller as in the previous embodiment. The controller operates the servomotor on the shaft 60 to position the flow diverter 58 in the same manner as the plate 22 is controlled.

When a pressure oscillation in the form of a travelling wave is initiated in the combustion chamber 42, it is immediately sensed by the difference in pressures at the probes 62. The direction of the rotation is likewise sensed by these probes. The controller positions the flow diverter 58 to provide the proper jet emerging from either the orifice 48 or 52 to oppose the travelling transverse wave. When this wave is stopped the pressure probes 62 will sense this information and initiate a signal which properly positions the flow diverter 58.

While several embodiments of the invention have been shown and described, it will be appreciated that various structural modifications may be made without departing from the spirit of the invention or the scope of the subjoined claims.

What is claimed is:

1. Apparatus for stabilizing a rocket combustor by controlling transverse instability during combustion of propellants in a combustion chamber comprising
    means for sensing the direction of travel of a travelling transverse wave in the combustion chamber, and
    means for selectively providing a tangential velocity in the combustion chamber in opposition to the travelling transverse wave.

2. Apparatus for stabilizing a rocket combustor as claimed in claim 1 including
    means for injecting a propellant into the combustion chamber in the form of a jet, and
    means for changing the vector direction of the propellant jet to oppose the travelling transverse wave whereby the energy released during combustion dampens said wave.

3. Apparatus for stabilizing a rocket combustor as claimed in claim 2 including
    an injector face plate at one end of the combustion chamber having a plurality of orifices therein for supplying a pressurized propellant to said chamber, each of said orifices being angularly disposed to the longitudinal axis of the combustor in a plane substantially parallel to said axis,
    a first group of said orifices being angularly disposed in one direction,
    a second group of said orifices being angularly disposed in another direction,
    a first manifold in communication with said first group of orifices for supplying propellant thereto.
    a second manifold in communication with said second group of orifices for supplying propellant thereto, said first and second groups of orifices providing intersecting jets of propellant when said first and second manifolds are connected thereto, each of said intersecting jets having a resulting vector substantially perpendicular to the face plate when the propellant flow is substantially equal through said orifices, and
    means for selectively controlling the supply of propellant to said first and second manifolds to alter the propellant flow through said first and second orifices thereby changing the resulting vector as said propellant flow changes.

4. Apparatus for stabilizing a rocket combustor as claimed in claim 3 including means for operably connecting the supply means for the first and second manifolds to the means for sensing the travelling transverse wave whereby the resulting vector is altered in response to the sensing of said wave.

5. Apparatus for stabilizing a rocket combustor as claimed in claim 1 including
    means for injecting a portion of the propellant tangentially into the combustion chamber in opposition to the travelling transverse wave whereby the energy release during combustion dampens said wave.

6. Apparatus for stabilizing a rocket combustor as claimed in claim 5 including
    an injector at one end of the combustion chamber for supplying a pressurized propellant thereto, said combustion chamber having a plurality of tangential orifices spaced about the periphery thereof adjacent said injector,
    a first group of said orifices facing in one direction,
    a second group of said orifices facing in the opposite direction,
    a first manifold in communication with said first group of orifices for supplying propellant thereto,
    a second manifold in communication with said second group of orifices for supplying propellant thereto, and
    means for selectively controlling the supply of propellant to said first and second manifolds so that propellant is injected tangentially into the combustion chamber.

7. Apparatus for stabilizing a rocket combustor as claimed in claim 6 including
    means for operably connecting the supply means for the first and second manifolds to the means for sensing a travelling transverse wave whereby a portion of the propellant is injected tangentially in response to the sensing of said wave.

8. A method of stabilizing a rocket combustor by controlling the transverse stability during combustion of a propellant in a combustion chamber comprising the steps of
    sensing a travelling transverse wave in the combustion chamber, and
    selectively providing a tangential velocity in the combustion chamber in opposition to the travelling transverse wave.

9. A method of stabilizing a rocket combustor as claimed in claim 8 including the step of changing the vector direction of the propellant as it is injected into the combustion chamber to oppose the travelling transverse wave whereby the energy release during combustion dampens said wave.

10. A method of stabilizing a rocket combustor as claimed in claim 8 including the step of injecting a portion of the propellant tangentially into the combustion chamber in opposition to the travelling transverse wave whereby the energy release during combustion dampens said wave.

References Cited

UNITED STATES PATENTS 3,174,283   3/1965   Crocco _____ 60—39.72

MARK M. NEWMAN, *Primary Examiner.*

D. HART, *Assistant Examiner.*

UNITED STATES PATENT OFFICE
CERTIFICATE OF CORRECTION

Patent No. 3,347,046                        October 17, 1967

Marcus F. Heidmann et al.

It is hereby certified that error appears in the above numbered patent requiring correction and that the said Letters Patent should read as corrected below.

In the heading to the printed specification, lines 4 to 6, strike out "Marcus F. Heidmann, 3490 Higley Road, Rocky River, Ohio 44116, and Charles E. Feiler, 4240 Wooster Road, Fairview Park, Ohio 44126" and insert instead -- Marcus F. Heidmann, Rocky River, and Charles E. Feiler, Fairview Park, Ohio, assignors to the United States of America as represented by the Administrator of the National Aeronautics and Space Administration --.

Signed and sealed this 26th day of November 1968.

(SEAL)
Attest:

Edward M. Fletcher, Jr.                      EDWARD J. BRENNER
Attesting Officer                           Commissioner of Patents